United States Patent
Bosen

(10) Patent No.: US 7,077,626 B2
(45) Date of Patent: Jul. 18, 2006

(54) TURBOMACHINE

(75) Inventor: Werner Bosen, Köln (DE)

(73) Assignee: Atlas Copco Engergas GmbH, Köln (DE)

( * ) Notice: Subject to any disclaimer, the term of this patent is extended or adjusted under 35 U.S.C. 154(b) by 201 days.

(21) Appl. No.: 10/779,024

(22) Filed: Feb. 13, 2004

(65) Prior Publication Data

US 2004/0240995 A1 Dec. 2, 2004

(30) Foreign Application Priority Data

Mar. 12, 2003 (DE) .............................. 103 10 677

(51) Int. Cl.
*F01D 25/16* (2006.01)
(52) U.S. Cl. ...................................... 415/177; 415/229
(58) Field of Classification Search ................ 415/229, 415/177; 417/901; 384/476
See application file for complete search history.

(56) References Cited

U.S. PATENT DOCUMENTS 4,418,544 A * 12/1983 Heybutzki et al. .......... 417/901

* cited by examiner

*Primary Examiner*—Edward K. Look
*Assistant Examiner*—Richard A. Edgar
(74) *Attorney, Agent, or Firm*—Collard & Roe, P.C.

(57) ABSTRACT

A turbomachine has a turborotor made up of a shaft and a rotor disk, and an electric machine having an electric rotor. The rotor disk is arranged at one end of the shaft, in overhung manner, and the electric rotor is connected with the shaft of the turborotor. The electric rotor is arranged on the other end of the shaft, also in overhung manner, and the shaft is mounted on shaft bearings in a bearing housing that thermally separates the shaft bearings from the electric machine.

4 Claims, 1 Drawing Sheet

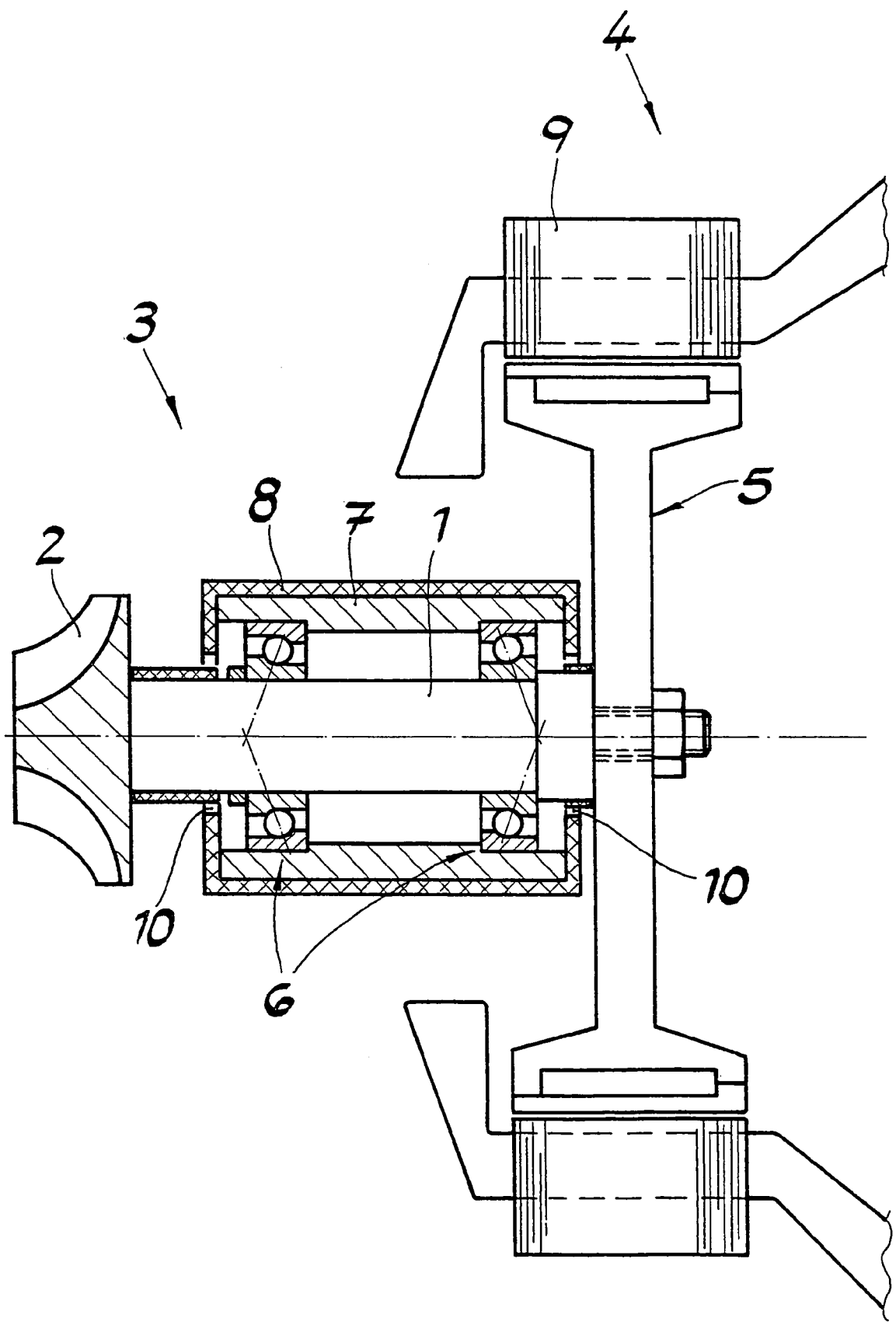

TURBOMACHINE

CROSS REFERENCE TO RELATED APPLICATIONS

Applicant claims priority under 35 U.S.C. §119 of German Application No. 103 10 677.4 filed Mar. 12, 2003.

BACKGROUND OF THE INVENTION

1. Field of the Invention

The present invention relates to a turbomachine having a turborotor made up of a shaft and a rotor disk, and an electric machine having an electric rotor, whereby the rotor disk is arranged at one end of the shaft, in overhung manner, and whereby the electric rotor is connected with the shaft of the turborotor.

2. The Prior Art

In the case of the turbomachines known from practice, having the characteristics described initially, the shaft is mounted on both sides of the electric rotor. This turborotor configuration makes great demands on the required production precision of the bearing holder bores. These demands particularly become significant when using fast-running high-precision roller bearings, which demand an alignment accuracy of the bearings relative to one another that lies within extremely close tolerances. This alignment accuracy is furthermore frequently ruined, despite extremely precise production of all the parts involved, in operation, as the result of opposite temperature distortions. In this connection, the temperature distortions result from the heat development in fast-running electric machines, which is quite significant, in some cases, on the one hand, and from the frequent use of turbomachines both at high temperatures and at low temperatures, particularly cryogenic temperatures, for example as liquid air turbines, on the other hand. It is furthermore disadvantageous that access to the electric rotor causes a great amount of effort for disassembly.

SUMMARY OF THE INVENTION

It is an object of the present invention to configure a turbomachine having the characteristics described initially, so that great alignment accuracy between the shaft bearings can be assured in thermally stressed operation. Furthermore, the electric rotor should be readily accessible.

These objects are accomplished, according to the invention, by arranging the electric rotor on the other end of the shaft, also in overhung manner, and by mounting the shaft on shaft bearings in a bearing housing that thermally separates the shaft bearings from the electric machine. In this connection, the shaft bearings and the bearing housing form a sealed unit. Therefore the bearing holder bores can be produced in a single chucking process. This arrangement allows a very great production precision with little effort. The turborotor therefore has a high level of running accuracy and low bearing friction. Because of the thermal separation of the shaft bearings from the electric machine, according to the invention, thermally induced stresses and geometrical changes in the bearings are reduced. In this connection, the bearing housing according to the invention represents effective protection against the heat development in the air gap between the rotor and the stator of the electric machine, which can be significant, in part. However, the arrangement according to the invention is also advantageous in connection with the occurrence of very low temperatures, particularly at cryogenic temperatures, which occur, for example, in connection with the operation of the turbomachine in a liquefaction plant. In total, the encapsulation of the shaft bearings in the common bearing housing further increases the running accuracy of the turborotor, and further reduces the bearing friction. Furthermore, the electric rotor is easily accessible from the face of the rotor, without parts of the shaft bearing having to be disassembled. This accessibility allows easy installation and removal of the rotor, for example.

The rotor disk can be configured as a compressor rotor disk for a compressor stage, and the electric rotor can be configured as a power take-off part of an electric motor. Alternatively, the rotor disk may be configured as a turbine rotor disk for an expansion stage and the electric rotor configured as a drive part of a generator.

Preferably, the bearing housing has shaft ducts for the shaft of the turborotor, which are provided with heat insulation, in order to further increase the thermal protection of the shaft bearings. In addition, the shaft segments between the bearing housing and the rotor disk, i.e. the rotor, can be provided with additional insulation rings, in order to further increase the protective effect. Preferably, the shaft bearings are configured as high-precision roller bearings or closely tolerated gas bearings. This arrangement allows precise and, at the same time, cost-effective bearing support.

BRIEF DESCRIPTION OF THE DRAWINGS

Other objects and features of the present invention will become apparent from the following detailed description considered in connection with the accompanying drawing. It should be understood, however, that the drawing is designed for the purpose of illustration only and not as a definition of the limits of the invention.

In the drawing,

The single FIGURE schematically shows a partial detail of the turbomachine according to the invention.

DETAILED DESCRIPTION OF PREFERRED EMBODIMENTS

The turbomachine shown in the sole FIGURE has a turborotor 3 made up of a shaft 1 and a rotor disk 2, and an electric machine 4 only shown partially, having an electric rotor 5 and a stator 9. Rotor disk 2 is arranged on one end of shaft 1, in overhung manner. Electric rotor 5 is connected with shaft 1 of turborotor 3 and also arranged in overhung manner on the other end of shaft 1.

Shaft 1 is mounted in shaft bearings 6 in a bearing housing 7. Housing 7 thermally separates shaft bearings 6 from electric machine 4 and is preferably provided with insulation 8. Shaft bearings 6, together with bearing housing 7, form a sealed unit. The bearing holder surfaces of bearing housing 7 can therefore be produced in a single chucking process. This arrangement allows a high level of production accuracy and, at the same time, low expenditure. A very high level of alignment accuracy of shaft bearings 6 relative to one another can be guaranteed. Turborotor 3 is therefore characterized by a high level of running accuracy and low bearing friction.

The thermal separation of shaft bearings 6 from electric machine 4 by means of common bearing housing 7, according to the invention, significantly reduces thermally induced distortions and geometrical changes in shaft bearings 6. In this connection, the thermal separation represents effective protection against the significant heat development in the air gap between rotor 5 and stator 9 of electric machine 4. The thermal separation additionally guarantees effective protection against low temperatures, particularly cryogenic temperatures. In total, the running accuracy of turborotor 3 is further increased by means of the thermal separation, and the bearing friction is further reduced. The overhung arrangement of electric rotor 5 furthermore allows easy accessibility from the face of turborotor 3, without parts of the bearing having to be disassembled, so that installation and maintenance work can be performed easily.

In the exemplary embodiment, rotor disk 2 is configured as a turbine wheel for a liquid air turbine, and electric rotor 5 is configured as a drive part of a generator. Rotor disk 2 may also be configured as a compressor rotor disk for a compressor stage, and electric rotor 5 may be configured as a power take-off part of an electric motor.

Bearing housing 7 has shaft ducts 10 provided with heat insulation, for shaft 1 of turborotor 3. In the exemplary embodiment, insulation 8 is provided, which surrounds the bearing housing 7 and extends radially up to shaft ducts 10. In addition, the shaft segments between bearing housing 7 and rotor disk 2, i.e. rotor 5, can be provided with insulation rings.

Shaft bearings 6 are configured as high-precision roller bearings. These roller bearings allow both precise and cost-effective bearing support.

Accordingly, although only at least one embodiment of the present invention has been shown and described, it is to be understood that many changes and modifications may be made thereunto without departing from the spirit and scope of the invention as defined in the appended claims.

What is claimed is:
1. A turbomachine comprising:
   (a) a turborotor comprising a shaft and a rotor disk arranged at a first end of said shaft in overhung manner, said rotor disk comprising a compressor rotor disk for a compressor stage;
   (b) an electric machine having an electric rotor connected with said shaft and arranged at a second end of said shaft in overhung manner, said electric rotor comprising a power take-off part of an electric motor; and
   (c) a bearing housing containing a plurality of shaft bearings mounting said shaft, said bearing housing thermally separating said shaft bearings from said electric machine.

2. The turbomachine according to claim 1, wherein said bearing housing has shaft ducts provided with heat insulation for said shaft.

3. The turbomachine according to claim 1, wherein said shaft bearings comprise roller bearings or gas bearings.

4. A turbomachine comprising:
   (a) a turborotor comprising a shaft and a rotor disk arranged at a first end of said shaft in overhung manner, said rotor disk comprising a turbine disk for an expansion stage;
   (b) an electric machine having an electric rotor connected with said shaft and arranged at a second end of said shaft in overhung manner, said electric rotor comprising a drive part of a generator; and
   (c) a bearing housing containing a plurality of shaft bearings mounting said shaft, said bearing housing thermally separating said shaft bearings from said electric machine.

* * * * *

UNITED STATES PATENT AND TRADEMARK OFFICE
CERTIFICATE OF CORRECTION

PATENT NO. : 7,077,626 B2 Page 1 of 1
APPLICATION NO. : 10/779024
DATED : July 18, 2006
INVENTOR(S) : Bosen It is certified that error appears in the above-identified patent and that said Letters Patent is hereby corrected as shown below:

On Title Page, item [73], please change "Atlas Copco Engergas GmbH" to correctly read: --Atlas Copco Energas GmbH--.

Signed and Sealed this

Twenty-first Day of November, 2006

JON W. DUDAS
*Director of the United States Patent and Trademark Office*